United States Patent
Ito

(10) Patent No.: US 6,248,944 B1
(45) Date of Patent: Jun. 19, 2001

(54) APPARATUS FOR SWITCHING PICTURE ITEMS OF DIFFERENT TYPES BY SUITABLE TRANSITION MODES

(75) Inventor: Emi Ito, Hamamatsu (JP)

(73) Assignee: Yamaha Corporation, Hamamatsu (JP)

( * ) Notice: Subject to any disclaimer, the term of this patent is extended or adjusted under 35 U.S.C. 154(b) by 0 days.

(21) Appl. No.: 09/396,096

(22) Filed: Sep. 14, 1999

(30) Foreign Application Priority Data

Sep. 24, 1998  (JP) ................................................ 10-269368

(51) Int. Cl.$^7$ ...................................................... G09B 15/02
(52) U.S. Cl. ............................ 84/477 R; 84/600; 84/610; 84/650; 434/307 A; 386/53
(58) Field of Search ........................ 358/908; 386/52–53, 386/55, 94; 84/600–602, 609–612, 634–636, 649–652, 666–668, 477 R, DIG. 6; 434/307 A, 307 R

(56) References Cited

U.S. PATENT DOCUMENTS

| | | | |
|---|---|---|---|
| 5,247,126 | * 9/1993 | Okamura et al. | ............... 84/609 |
| 5,863,206 | * 1/1999 | Narusawa et al. | ............... 434/307 A |
| 5,926,603 | * 7/1999 | Tanaka et al. | ............... 386/53 |

* cited by examiner

Primary Examiner—Robert E. Nappi
Assistant Examiner—Marlon Fletcher
(74) Attorney, Agent, or Firm—Pillsbury Winthrop LLP

(57) ABSTRACT

A karaoke apparatus is constructed for producing karaoke accompaniments of requested songs while switching picture items of different types displayed on a monitor. In the karaoke apparatus, a sound source block works in an operating period when a requested song is present for producing the karaoke accompaniment, and does not work in a non-operating period when a requested song is absent. A picture source block provides picture items of different types suitable for use in either of the operating period and the non-operating period. A picture mixing block provides a plurality of transition modes selectively adaptable when a preceding picture item is switched to a succeeding picture item along a passage of the operating period and the non-operating period. A control block selects one of the transition modes according to the type of the preceding picture item and the type of the succeeding picture item for enabling the picture mixing block to connect the preceding picture item to the succeeding picture item by the selected transition mode.

12 Claims, 3 Drawing Sheets

FIG.3

| To<br>From | KARAOKE BGV | FREE BGV | CM | ALERT |
|---|---|---|---|---|
| KARAOKE BGV | BLANKING | (BLANKING) | CROSS-FADE | CUT-IN/CUT-OUT |
| FREE BGV | BLANKING | (BLANKING) | CROSS-FADE | CUT-IN/CUT-OUT |
| CM | BLANKING | CROSS-FADE | EFFECTS | CUT-IN/CUT-OUT |
| ALERT | BLANKING | CROSS-FADE | EFFECTS | CUT-IN/CUT-OUT |

APPARATUS FOR SWITCHING PICTURE ITEMS OF DIFFERENT TYPES BY SUITABLE TRANSITION MODES

BACKGROUND OF THE INVENTION

1. Field of the Invention

The present invention relates to a picture switching apparatus that selects a transition mode according to types of current and next pictures at the time of switching pictures.

2. Description of Related Art

A karaoke apparatus is designed to superimpose a word telop of lyrics to a background motion picture displayed on a monitor during the course of karaoke music performance. When performing no piece of karaoke music, the karaoke apparatus displays only a background video picture or reproduces a commercial message (CM) picture on the monitor in a vacant period between karaoke musical pieces so as to present horoscope, event information, music introduction and so on. The monitor of the karaoke apparatus may also display an alert picture to inform users of a credit shortage or a failure in the machine.

The karaoke apparatus thus displays several pictures in accordance with various situations, but does not take into account smooth and natural transition from a preceding picture item to a succeeding picture item at the time of switching the picture items. In other words, the karaoke apparatus merely conducts simple switching such as to execute end processing when the preceding picture is ended and to execute start processing when the succeeding picture is started. For example, a blue back frame may appear after the preceding picture is ended and then vary to a gray back frame before the succeeding picture is started. This causes the problem of unnatural picture switching, and is incapable of effective start of reproduction of the succeeding picture.

SUMMARY OF THE INVENTION

It is an object of the invention to provide a picture switching apparatus that selects a transition mode in consideration of the smooth and natural connection between preceding and succeeding pictures so that the pictures can be switched from one to another naturally and effectively.

According to the invention, there is provided a picture switching apparatus that takes in plural types of pictures and selectively outputs one of the pictures. The inventive picture switching apparatus comprises a switching section capable of switching one picture item to another picture item in plural types of transition modes, and a control section that instructs the switching section to select a transition mode according to the type of a picture currently displayed and the type of a subsequent picture at the time of switching the pictures.

The picture transition modes may include cross-fade, cut-in/cut-out, blanking via a blue back frame, and switching with several effects such as dissolve and scroll. The cross-fade or the switching with effects are used for smooth switching from one situation to another situation. The cut-in/cut-out is used to emphasize the coming picture display. The transition mode is thus selected according to types of preceding and succeeding pictures. This allows suitable switching for the pictures.

BRIEF DESCRIPTION OF THE DRAWINGS

These and other objects of the invention will be seen by reference to the description, taken in connection with the accompanying drawings, in which:

FIG. 3 is a diagram illustrating a transition mode selection table.

DETAILED DESCRIPTION OF PREFERRED EMBODIMENTS

Figure 1:
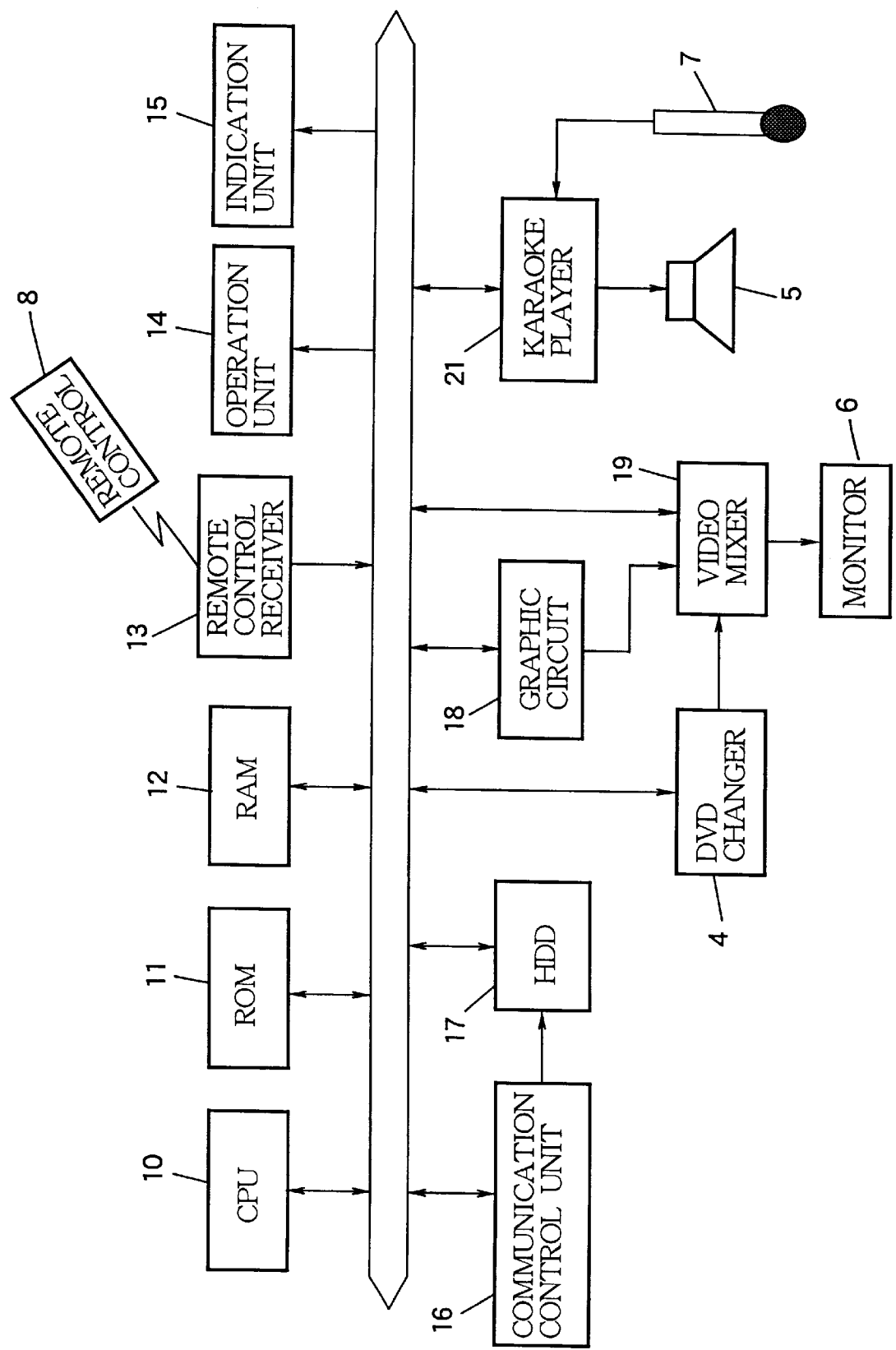
FIG. 1 is a block diagram of a karaoke apparatus practiced as one preferred embodiment of the invention.
Figure 2:
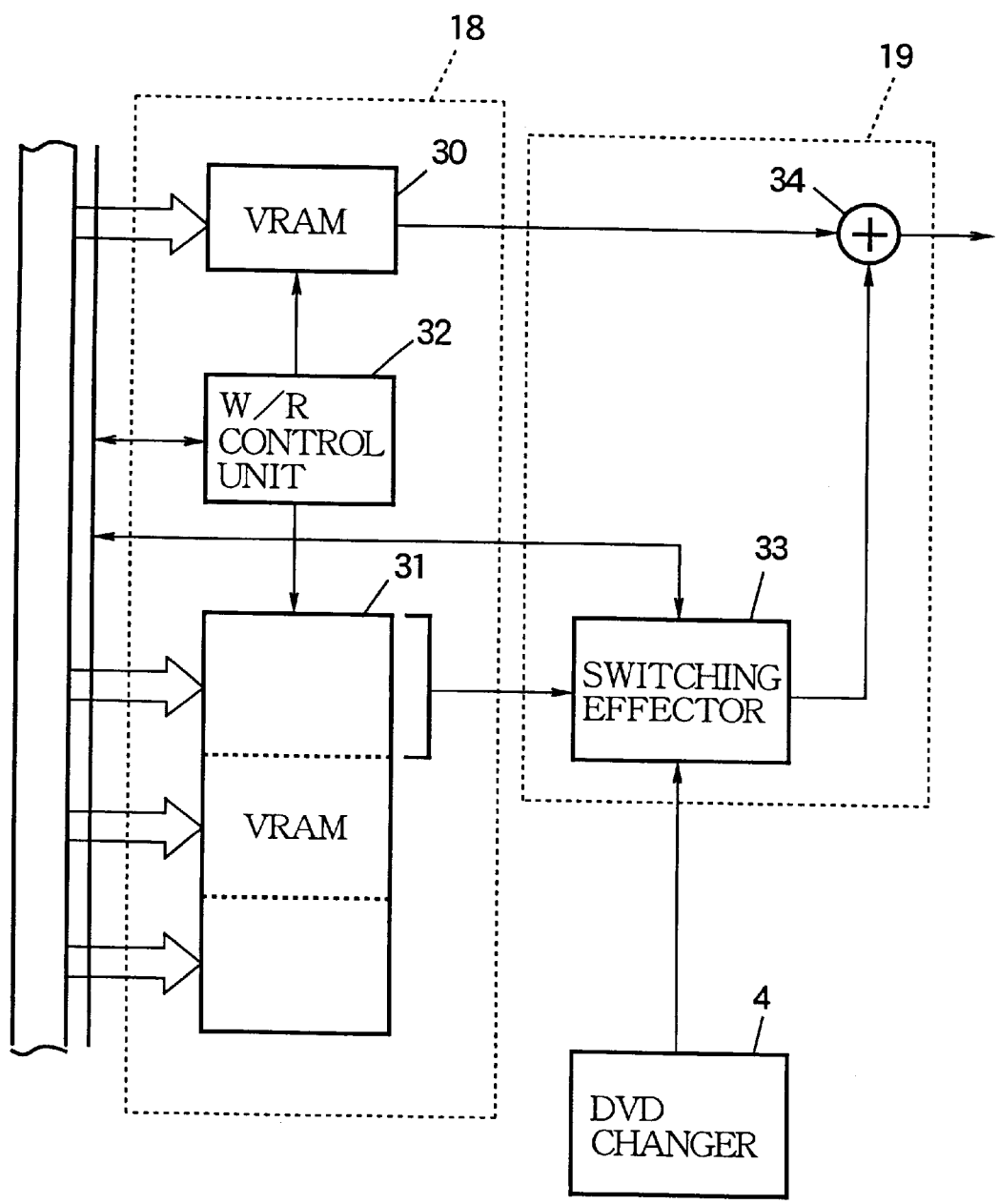
FIG. 2 is a diagram illustrating configuration of a graphic circuit and a video mixer in the karaoke apparatus.

A karaoke apparatus and a video mixer practiced as one preferred embodiment of the invention will be described with reference to the accompanying drawings. FIG. 1 is a block diagram of the inventive karaoke apparatus, and FIG. 2 is a diagram illustrating configuration of a graphic circuit and a video mixer in the karaoke apparatus.

In the karaoke apparatus, a karaoke player 21 generates sound of a karaoke performance based on music data. The karaoke player 21 includes a sound source for producing the sound of the karaoke performance and a PCM decoder for decoding voice data of a chorus part or else. In synchronization with the karaoke performance, a background video and a word telop of lyrics are superposed to each other by image synthesis and are displayed on a monitor 6.

The word telop is developed on a VRAM of a graphic circuit 18 based on character patterns, and synthesized with the background video (BGV) by means of a video mixer 19. The BGV is reproduced by a DVD changer 4. In addition to the word telop, the graphic circuit 18 has the ability to decompress or expand several still pictures and to output resultant picture signals. The video mixer 19 has the ability not only to superimpose the word telop on the background video, but also to execute other processing such as a cross-fade of the BGV with a still picture outputted from the graphic circuit 18.

A CPU (central processing unit) 10 controls the entire system in the karaoke apparatus, and is connected to a ROM 11, a RAM 12, a hard disk drive 17, a communication control unit 16, a remote control receiver 13, an operation unit 14, an indicator unit 15, the graphic circuit 18, the video mixer 19, the karaoke player 21, and the DVD changer 4.

The ROM 11 stores a program for activating the karaoke apparatus and the like. The hard disk drive 17 stores music data for karaoke music performance and still picture data for displaying several still pictures. The hard disk drive 17 Ad also stores programs, such as a system program, a karaoke performance program, and a loader, and character pattern data. The system program is executed to control the basic operation in the karaoke apparatus, which is loaded into the RAM 12 when the karaoke apparatus is activated. The karaoke performance program is executed to control the karaoke player 21 based on the music data. The loader is used to download music data and picture data for background video from a distribution center. The character pattern data is used for developing character patterns from word information of lyrics or title of a song given as code information.

The still picture data includes CM picture data for use in a non-operating period between sequential performance of karaoke musical pieces. The CM picture data contains plural still pictures such as new music introduction, horoscope, and event information. The CM pictures are serially displayed on the monitor 6. The still picture data further includes alert picture data such as a graphic message "the next music cannot be played back because of a credit shortage," or another graphic message "this music cannot be played back because of an error."

The RAM 12 has an area for loading the above mentioned various programs, and a work area for loading music data that is currently in progress.

The communication control unit 16 is a kind of a controller that communicates with the remote distribution center through a communication line to download music data and the like. The communication control unit 16 has a built-in DMA circuit by which the downloaded music data and picture data can be written directly into the hard disk drive 17 without passing through the CPU 10.

The remote control receiver 13 receives and restores an infrared signal sent from a remote control 8. The remote control 8 is equipped with plural key switches such as numeric keys for inputting music numbers and a set key for setting the music numbers. When a user operates these key switches, the remote control 8 transmits an infrared code signal corresponding to the key switches operated. The remote control receiver 13 receives the infrared code signal, restores the same into command data, and outputs the command data to the CPU 10. The CPU 10 conducts various processing such as to reserve a karaoke musical piece or to change a tune of the karaoke music piece based on the inputted command data. The operation unit 14 is provided on a front panel of the karaoke apparatus, which is equipped with key switches similar to those on the remote control 8. The indicator unit 15 is also provided on the front panel of the karaoke apparatus, which includes an LED matrix indicator for indicating the music number currently in progress, a number of reserved musical pieces, and so on.

The karaoke player 21 includes a sound source composed of a tone generating circuit for generating the sound of karaoke performance based on the music data. The karaoke player 21 further includes a PCM decoder, a DSP for creating acoustic effects and so on. The sound source generates the sound of the karaoke musical piece based on a musical sound track in the music data. The PCM decoder reproduces a singing voice such as a back chorus based on voice data contained in the karaoke music data. The DSP adds acoustic effects such as echo or reverb to the generated sound and the reproduced voice. The karaoke player 21 is also connected to a microphone 7, and mixes a singing voice signal inputted from the microphone 7 with the sound of the karaoke performance before output to a speaker 5.

FIG. 2 shows the configuration of the graphic circuit 18 and the video mixer 19. The graphic circuit 18 is equipped with a set of large and small VRAMS. The small VRAM 30 has a storage capacity for one frame of the monitor 6, and is used only to develop character patterns of the word telop of lyrics and the like. The large VRAM 31 has a storage capacity for three frames. One part is allotted to a physical screen frame, and two parts are allotted to two virtual screen frames. The large VRAM 31 can be used not only to expand still pictures, but also to create picture switching effects such as dissolve or scroll at the time of making a copy between two frames or at the time of switching one physical screen frame to another. It should be noted that the physical screen frame stores the picture contents which are currently output to the video mixer 19. In general, when a still picture is decompressed or expanded by an application program, the still picture under control is drawn onto the virtual screen frames alone. Such drawing operation and picture switching effects are conducted by a W/R control unit 32 in accordance with instructions from the CPU 10. Thus, the CPU 10 constitutes the control section of the inventive picture switching apparatus.

A description is made next to the picture switching effects. The dissolve effect is such that a still picture is copied on the physical screen frame one dot after another at random so as to replace the current still picture with the next still picture one dot after another until the next still picture finally covers all over the frame. The scroll effect is such that an area of the current physical screen frame is gradually shifted to an area of the next physical screen frame so that the screen will appear to be moved from the current still image to the next still image. Alternatively, the next image can be copied on the physical screen frame line by line or column by column, hence a so-called wipe effect can be created.

It is needless to say that the screen of the monitor can be instantaneously switched from the current still picture to a next still picture in a cut-in/cut-out transition mode by copying the next picture data onto the physical screen frame in one stroke operation, or by switching the physical screen frame to another frame (virtual screen frame) in a stroke.

These picture switching effects are executed by the W/R control unit 32 in accordance with instructions from the CPU 10, but each individual drawing process may be realized either by an automatic drawing function of the graphic circuit 18, or in accordance with sequential instructions from the CPU 10 to the W/R control unit 32.

The video mixer 19 includes a switching effector 33 and a telop synthesizer 34. The switching effector 33 is a circuit to execute synthesis and switching between a picture signal (still picture) outputted from the VRAM 31 of the graphic circuit 18 and a motion picture signal (background video) reproduced and outputted from the DVD changer 4. The video mixer 19 is a circuit to deal with a composite video signal or analog picture signal. The switching effector 33 can switch the still picture and the background video in any transition mode such as cut-in/cut-out, cross-fade, or wipe. The cut-in/cut-out is a mode that changes over the picture signals at once. The cross-fade is a mode that gradually changes the concentration of one picture signal from 0% to 100% in synchronization with changes in the concentration of the other picture signal from 100% to 0% so as to switch one picture signal to the other to be output. The wipe is a mode that switches the scene across the boundary of display regions on the screen such as a vertical or horizontal line or a circle. The switching effector 33 also has a function for outputting blue back, gray back and black out picture signals. Thus, the switching effector 33 functions as the switching section of the picture switching apparatus to switch the input picture signals in the above transition modes or to make an output of blue back, gray back or black out picture signal, in accordance with instructions from the CPU 10.

The CPU 10 switches the screen of the monitor 6 from the karaoke music BGV displayed while a karaoke musical piece is being performed to one of various pictures such as free BGV, CM picture, or alert picture in a non-operating period between the karaoke plays of musical pieces, dependently on the situation. The CPU 10 selects an optimum transition mode according to the types of pictures between which the switching should be conducted. Then, the CPU 10 switches the pictures in the selected mode. It should be noted that the picture signal outputted from the switching effector 33 and the picture signal of the word telop inputted from the VRAM 30 are overlapped and synthesized with each other, and then outputted to the monitor 6. The data on the VRAM 30 is normally cleared during other than the karaoke performance.

Referring back to FIG. 1, the inventive karaoke apparatus is constructed for producing karaoke accompaniments of requested songs while switching picture items of different types displayed on the monitor 6. In the karaoke apparatus, the sound source block of the karaoke player 21 works in an operating period when a requested song is present for producing the karaoke accompaniment, and does not work in a non-operating period when a requested song is absent. A picture source block such as the graphic circuit 18 and the DVD changer 4 provides picture items of different types suitable for use in either of the operating period and the non-operating period. A picture mixing block or the video mixer 19 provides a plurality of transition modes selectively adaptable when a preceding picture item is switched to a succeeding picture item along a passage of the operating period and the non-operating period. A control block or CPU 10 selects one of the transition modes according to the type of the preceding picture item and the type of the succeeding picture item for enabling the picture mixing block to connect the preceding picture item to the succeeding picture item by the selected transition mode.

FIG. 3 is a diagram illustrating a transition mode selection table to which the CPU 10 refers at the time of switching pictures. The transition mode selection table is stored in the hard disk drive 17 and loaded into the RAM 12 when the karaoke apparatus is activated. Upon picture switching, the karaoke apparatus selects an optimum transition mode for the picture switching through the table retrieval using as key indexes the type of picture currently displayed and the type of picture to be next displayed. Then, the karaoke apparatus instructs a predetermined unit (the graphic circuit 18 or the video mixer 19) to enter the selected transition mode. The table stores a plurality of transition modes selected when switching the following picture items: karaoke BGV (background video dedicated for a karaoke musical piece); free BGV inserted between karaoke plays of musical pieces (a motion picture that should be displayed during other than the karaoke music performance); CM video presented in the non-operating period (plural still pictures for new music introduction and the like); and alert video (a still image such as a warning message to users). These preceding picture items are switched to the succeeding items such as the dedicated karaoke BGV, the free BGV, the CM video, and the alert video. Namely, the picture source block of the karaoke apparatus provides picture items of different types including the dedicated background video type suitable for use in the operating period of a corresponding requested song, the free background video type suitable for filling the ma non-operating period, the commercial message type suitable for use in the non-operating period, and the alert type incidentally usable in either of the operating period and the non-operating period.

The transition modes include: a blanking mode switching via a blank frame such as a blue back frame with high-speed fade switching between the blue back frame and picture frames; a cross-fade mode; an effect mode such as Dissolve, scroll or wipe (one of these effects are selected at random or based on a predetermined rule); and a cut-in/cut-out mode. Namely, the picture mixing block of the karaoke apparatus provides a plurality of the transition modes including the cross-fade transition mode where one picture item fades out and another picture item fades in, the cut-in/cut-out transition mode where one picture item is cut out and another picture item is cut in, the blanking transition mode where one picture item is switched momentarily to a blank picture such as a blue back frame and then switched to another picture item, and the effect transition mode where one picture item is connected to another picture item by a visual effect selected from dissolving, scrolling and wiping.

For example, if the dedicated karaoke BGV is to be switched to the CM video between karaoke play sessions of music pieces, the switching is conducted by the cross-fade mode. The cross-fade is executed by the switching effector 33 of the video mixer 19. Conversely, if the CM video presented in the non-operating period or vacant period between karaoke play sessions is to be switched to a dedicated karaoke BGV, the switching is done by the blanking transition mode via the blue back frame. This processing is also executed by the switching effector 33. Thus, the same transition mode may not be adopted in a case where the switching direction is opposite even if the switching is done between the same types of picture items, because the transition mode is selected according to the current situation of the displayed picture.

The switching to a karaoke BGV is conducted at the start of a karaoke music performance. When a karaoke performance is started, reproduction of a desired BGV is started after a list of currently reserved music pieces and the music title to be played back first are displayed. In such a case, the switching is done by the blanking mode using the blue back frame so that karaoke users can easily see the contents of the above display irrespective of the current scene from which the karaoke BGV succeeds. Generally, the control block of the karaoke apparatus selects the blanking transition mode for switching a preceding picture item selected from the dedicated background video type, the free background video type, the commercial message type and the alert type to a succeeding picture item of the dedicated background video type.

Since the alert picture is displayed to give users a warning in advance, the karaoke apparatus uses the cut-in/cut-out mode in which the screen of the monitor is switched instantly rather than switching gradually, irrespective of the type of the preceding scene from which the alert picture succeeds. Namely, the control block selects the cut-in/cut-out transition mode for switching the preceding picture item selected from the dedicated background video type, the free background video type, the commercial message type and the alert type to the succeeding picture item of the alert type.

If a video picture inputted from the DVD such as a karaoke BGV filling the operating period or a free BGV filling the non-operating period other than the operating period is to be switched to a CM picture, the cross-fade function of the picture synthesizer 32 is used for the cross-fade transition. Namely, the control block selects the cross-fade transition mode for switching one picture item selected from the dedicated background video type and the free background video type to another picture item of the commercial message type.

Similarly, if a still picture such as the CM picture and the alert picture is to be switched to the free BGV, the cross-fade function of the picture synthesizer 32 is used for the cross-fade transition. This allows smooth, natural switching. Namely, the control block selects the cross-fade transition mode for switching one picture item selected from the commercial message type and the alert type to another picture item of the free background video type.

On the other hand, if a still picture such as a CM picture or an alert picture is to be switched to another CM picture between musical pieces, an effect switching function of the graphic circuit 18 is used for effectuating dissolve switching or the like, so that the still pictures can be dynamically switched from one to another with a variety. Namely, the control block selects the effect transition mode for switching one picture item selected from the commercial message type and the alert type to another picture item of the commercial message type.

In general, the karaoke apparatus does not conduct a particular shift from a karaoke BGV or a free BGV to another free BGV. However, if necessary, the switching is done by the blanking mode using the blue back. It should be noted that the invention is not limited to the types of pictures to be changed over and the types of transition modes as described in the above embodiment.

Further, the invention covers a machine readable medium such as a DVD disk loadable into the DVD changer 4 for use in the picture switching apparatus having the CPU 10 and the monitor 6. The medium contains program instructions executable by the CPU 10 for causing the picture switching apparatus to perform a process of switching picture items of different types displayed on the monitor 6. The process is conducted by the steps of providing a plurality of transition modes selectively adaptable when a preceding picture item is to be connected to a succeeding picture item, selecting one of the transition modes according to the type of the preceding picture item and the type of the succeeding picture item, and switching the preceding picture item to the succeeding picture item by the selected transition mode.

According to the invention, an optimal transition mode is selected according to the type of a picture currently outputted and the type of a subsequent picture, and the picture switching is done in the selected mode. For example, the cross-fade switching is used to switch the pictures smoothly, while the cut-in/cut-out switching is used to emphasize the subsequent picture. Thus, the preceding picture can be switched to the succeeding picture naturally and effectively.

What is claimed is:

1. A picture switching apparatus for switching picture items of different types displayed on a monitor, comprising:
    a switching section that provides a plurality of transition modes selectively adaptable when one picture item is to be connected to another picture item; and
    a control section that selects one of the transition modes according to the type of said one picture item and the type of said another picture item for enabling the switching section to switch said one picture item to said another item by the selected transition mode.

2. The picture switching apparatus according to claim 1, wherein the switching section provides a plurality of transition modes including two or more of a cross-fade transition mode where said one picture item fades out and said another picture item fades in, a cut-in/cut-out transition mode where said one picture item is cut out and said another picture item is cut in, a blanking transition mode where said one picture item is switched momentarily to a blank picture and then switched to said another picture item, and an effect transition mode where said one picture item is connected to said another picture item by a visual effect selected from dissolving, scrolling and wiping.

3. A method of switching picture items of different types displayed on a monitor, comprising the steps of:
    providing a plurality of transition modes selectively adaptable when one picture item is to be connected to another picture item;
    selecting one of the transition modes according to the type of said one picture item and the type of said another picture item; and
    switching said one picture item to said another item by the selected transition mode.

4. A machine readable medium for use in a picture switching apparatus having a processor and a monitor, the medium containing program instructions executable by the processor for causing the picture switching apparatus to perform a process of switching picture items of different types displayed on the monitor, wherein the process comprises the steps of:
    providing a plurality of transition modes selectively adaptable when one picture item is to be connected to another picture item;
    selecting one of the transition modes according to the type of said one picture item and the type of said another picture item; and switching said one picture item to said another item by the selected transition mode.

5. A karaoke apparatus for producing karaoke accompaniments of requested songs while switching picture items of difference types displayed on a monitor, comprising:
    a sound source block that works in an operating period when a requested song is present for producing the karaoke accompaniment and that does not work in a non-operating period when the requested song is absent;
    a picture source block that provides picture items of different types suitable for use in either of the operating period and the non-operating period;
    a picture mixing block that provides a plurality of transition modes selectively adaptable when one picture item is switched to another picture item along a passage of the operating period and the non-operating period; and
    a control block that selects one of the transition modes according to the type of said one picture item and the type of said another picture item for enabling the picture mixing block to connect said one picture item to said another picture item by the selected transition mode.

6. The karaoke apparatus according to claim 5, wherein the picture source block provides picture items of different types including a dedicated background video type suitable for use in the operating period of a corresponding requested song, and at least one of a free background video type suitable for use in the non-operating period, a commercial message type suitable for use in the non-operating period and an alert type incidentally usable in either of the operating period and the non-operating period.

7. The karaoke apparatus according to claim 6, wherein the picture mixing block provides a plurality of the transition modes including two or more of a cross-fade transition mode where said one picture item fades out and said another picture item fades in, a cut-in/cut-out transition mode where said one picture item is cut out and said another picture item is cut in, a blanking transition mode where said one picture item is switched momentarily to a blank picture and then switched to said another picture item, and an effect transition mode where said one picture item is connected to said another picture item by a visual effect selected from dissolving, scrolling and wiping.

8. A karaoke apparatus for producing karaoke accompaniments of requested songs while switching picture items of different types displayed on a monitor, comprising:
    a sound source block that works in an operating period when a requested song is present for producing the karaoke accompaniment and that does not work in a non-operating period when the requested song is absent;
    a picture source block that provides picture items of different types suitable for use in either of the operating period and the non-operating period;
    a picture mixing block that provides a plurality of transition modes selectively adaptable when one picture item is switched to another picture item along a passage of the operating period and the non-operating period; and a control bock that selects one of the transition modes according to the type of said one picture item and the type of said another picture item for enabling the picture mixing block to connect one said picture item to said another picture item by the selected transition mode, wherein the picture source block provides picture items of different types including a dedicated background video type suitable for use in the operating period of a corresponding requested song, and at least one of a free background video type suitable for use in the non-operating period, a commercial message type suitable for use in the non-operating period and an alert type incidentally usable in either of the operating period and the non-operating period, the picture mixing block provides a plurality of transition modes including two or more of a cross-fade transition mode where said one picture item fades out and said another picture item fades in, a cut-in/cut-out transition mode where said one picture item is cut out and said another picture item is cut in, a blanking transition mode where said one picture item is switched momentarily to a blank picture and then switched to said another picture item, and an effect transition mode where said one picture item is connected to said another picture item by a visual effect selected from dissolving, scrolling and wiping, and the control block selects the blanking transition mode for switching said one picture item selected from the dedicated background video type, the free background video type, the commercial message type and the alert type to said another picture item of the dedicated background video type.

9. A karaoke apparatus for producing karaoke accompaniments of requested songs while switching picture items of different types displayed on a monitor, comprising:

a sound source block that works in an operating period when a requested song is present for producing the karaoke accompaniment and that does not work in a non-operating period when the requested song is absent;

a picture source block that provides picture items of different types suitable for use in either of the operating period and the non-operating period;

a picture mixing block that provides a plurality of transition modes selectively adaptable when one picture item is switched to another picture item along a passage of the operating period and the non-operating period; and a control bock that selects one of the transition modes according to the type of said one picture item and the type of said another picture item for enabling the picture mixing block to connect one said picture item to said another picture item by the selected transition mode, wherein the picture source block provides picture items of different types including a dedicated background video type suitable for use in the operating period of a corresponding requested song, and at least one of a free background video type suitable for use in the non-operating period, a commercial message type suitable for use in the non-operating period and an alert type incidentally usable in either of the operating period and the non-operating period, the picture mixing block provides a plurality of transition modes including two or more of a cross-fade transition mode where said one picture item fades out and said another picture item fades in, a cut-in/cut-out transition mode where said one picture item is cut out and said another picture item is cut in, a blanking transition mode where said one picture item is switched momentarily to a blank picture and then switched to said another picture item, and an effect transition mode where said one picture item is connected to said another picture item by a visual effect selected from dissolving, scrolling and wiping, and the control block selects the cut-in/cut-out transition mode for switching said one picture item selected from the dedicated background video type, the free background video type, the commercial message type and the alert type to said another picture item of the alert type.

10. A karaoke apparatus for producing karaoke accompaniments of requested songs while switching picture items of different types displayed on a monitor, comprising:

a sound source block that works in an operating period when a requested song is present for producing the karaoke accompaniment and that does not work in a non-operating period when the requested song is absent;

a picture source block that provides picture items of different types suitable for use in either of the operating period and the non-operating period;

a picture mixing block that provides a plurality of transition modes selectively adaptable when one picture item is switched to another picture item along a passage of the operating period and the non-operating period; and a control bock that selects one of the transition modes according to the type of said one picture item and the type of said another picture item for enabling the picture mixing block to connect one said picture item to said another picture item by the selected transition mode, wherein the picture source block provides picture items of different types including a dedicated background video type suitable for use in the operating period of a corresponding requested song, and at least one of a free background video type suitable for use in the non-operating period, a commercial message type suitable for use in the non-operating period and an alert type incidentally usable in either of the operating period and the non-operating period, the picture mixing block provides a plurality of transition modes including two or more of a cross-fade transition mode where said one picture item fades out and said another picture item fades in, a cut-in/cut-out transition mode where said one picture item is cut out and said another picture item is cut in, a blanking transition mode where said one picture item is switched momentarily to a blank picture and then switched to said another picture item, and an effect transition mode where said one picture item is connected to said another picture item by a visual effect selected from dissolving, scrolling and wiping, and the control block selects the cross-fade transition mode for switching said one picture item selected from the dedicated background video type and the free background video type to said another picture item of the commercial message type.

11. A karaoke apparatus for producing karaoke accompaniments of requested songs while switching picture items of different types displayed on a monitor, comprising:

a sound source block that works in an operating period when a requested song is present for producing the karaoke accompaniment and that does not work in a non-operating period when the requested song is absent;

a picture source block that provides picture items of different types suitable for use in either of the operating period and the non-operating period;

a picture mixing block that provides a plurality of transition modes selectively adaptable when one picture item is switched to another picture item along a passage of the operating period and the non-operating period; and a control bock that selects one of the transition modes according to the type of said one picture item and the type of said another picture item for enabling the picture mixing block to connect one said picture item to said another picture item by the selected transition mode, wherein the picture source block provides picture items of different types including a dedicated background video type suitable for use in the operating period of a corresponding requested song, and at least one of a free background video type suitable for use in the non-operating period, a commercial message type suitable for use in the non-operating period and an alert type incidentally usable in either of the operating period and the non-operating period, the picture mixing block provides a plurality of transition modes including two or more of a cross-fade transition mode where said one picture item fades out and said another picture item fades in, a cut-in/cut-out transition mode where said one picture item is cut out and said another picture item is cut in, a blanking transition mode where said one picture item is switched momentarily to a blank picture and then switched to another picture item, and an effect transition mode where said one picture item is connected to said another picture item by a visual effect selected from dissolving, scrolling and wiping, and the control block selects the cross-fade transition mode for switching one said picture item selected from the commercial message type and the alert type to said another picture item of the free background video type.

12. A karaoke apparatus for producing karaoke accompaniments of requested songs while switching picture items of different types displayed on a monitor, comprising:

a sound source block that works in an operating period when a requested song is present for producing the karaoke accompaniment and that does not work in a non-operating period when the requested song is absent;

a picture source block that provides picture items of different types suitable for use in either of the operating period and the non-operating period;

a picture mixing block that provides a plurality of transition modes selectively adaptable when one picture item is switched to another picture item along a passage of an operating period and the non-operating period; and a control bock that selects one of the transition modes according to the type of said one picture item and the type of said another picture item for enabling the picture mixing block to connect one said picture item to said another picture item by the selected transition mode, wherein the picture source block provides picture items of different types including a dedicated background video type suitable for use in the operating period of a corresponding requested song, and at least one of a free background video type suitable for use in the non-operating period, a commercial message type suitable for use in the non-operating period and an alert type incidentally usable in either of the operating period and the non-operating period, the picture mixing block provides a plurality of transition modes including two or more of a cross-fade transition mode where said one picture item fades out and said another picture item fades in, a cut-in/cut-out transition mode where said one picture item is cut out and said another picture item is cut in, a blanking transition mode where said one picture item is switched momentarily to a blank picture and then switched to another picture item, and an effect transition mode where said one picture item is connected to said another picture item by a visual effect selected from dissolving, scrolling and wiping, and the control block selects the effect transition mode for switching said one picture item selected from the commercial message type and the alert type to said another picture of the commercial message type.

* * * * *